(12) United States Patent
Sato et al.

(10) Patent No.: US 9,120,264 B2
(45) Date of Patent: Sep. 1, 2015

(54) INJECTION MOLDING MACHINE

(71) Applicant: SUMITOMO HEAVY INDUSTRIES, LTD., Tokyo (JP)

(72) Inventors: Hiroshi Sato, Chiba (JP); Koki Tsunemi, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 71 days.

(21) Appl. No.: 13/780,016

(22) Filed: Feb. 28, 2013

(65) Prior Publication Data

US 2013/0259962 A1    Oct. 3, 2013

(30) Foreign Application Priority Data

Mar. 27, 2012    (JP) .................................. 2012-072013

(51) Int. Cl.
*B29C 45/42*    (2006.01)
*B29C 45/80*    (2006.01)
*B29C 45/40*    (2006.01)
*B29C 45/76*    (2006.01)

(52) U.S. Cl.
CPC ............. *B29C 45/80* (2013.01); *B29C 45/4005* (2013.01); *B29C 45/7626* (2013.01); *B29C 45/42* (2013.01); *B29C 2045/4036* (2013.01); *B29C 2045/764* (2013.01); *B29C 2045/7606* (2013.01); *B29C 2945/7602* (2013.01); *B29C 2945/76006* (2013.01); *B29C 2945/76244* (2013.01); *B29C 2945/76247* (2013.01); *B29C 2945/76418* (2013.01); *B29C 2945/76933* (2013.01)

(58) Field of Classification Search
CPC .................................................. B29C 45/4005
USPC ........................... 425/139, 556; 264/334, 336
See application file for complete search history.

(56) References Cited

U.S. PATENT DOCUMENTS

| 6,533,972 | B1 | 3/2003 | Stirn |
| 2004/0262799 | A1 | 12/2004 | Wang |
| 2008/0233227 | A1 | 9/2008 | Onishi et al. |

FOREIGN PATENT DOCUMENTS

| EP | 1 205 291 A1 | 5/2002 |
| EP | 1 382 429 A1 | 1/2004 |
| EP | 1 609 580 A2 | 12/2005 |
| EP | 1 872 926 A2 | 1/2008 |
| JP | S61-102227 | 5/1986 |

(Continued)

OTHER PUBLICATIONS

Cincinnati Milacron pamphlet entitled Complete Automatic Manufacturing Activity Control, Mar. 1984.*

(Continued)

*Primary Examiner* — Tim Heitbrink
(74) *Attorney, Agent, or Firm* — IPUSA, PLLC

(57) ABSTRACT

A disclosed injection molding machine includes an ejector rod that is used to protrude a molding product from a mold, a driving source that moves the ejector rod in an axial direction of the ejector rod, a controller that controls the driving source, a position detector that detects the position of the ejector rod, and an operations unit that receives an input operation input by a user, wherein the controller sets up a current position of the ejector rod, which is detected by the position detector when the operations unit receives a first button operation operated by the user, to be a waiting position of the ejector rod after protruding the ejector rod or to be a protruding position of the ejector rod.

6 Claims, 5 Drawing Sheets

(56) References Cited

FOREIGN PATENT DOCUMENTS

| | | |
|---|---|---|
| JP | H05-269814 | 10/1993 |
| JP | 2002-307509 | 10/2002 |
| JP | 2011-230310 | 11/2011 |
| WO | WO2005/068155 | 7/2005 |

OTHER PUBLICATIONS

Extended European Search Report dated Apr. 17, 2014.

* cited by examiner

INJECTION MOLDING MACHINE

RELATED APPLICATIONS

Priority is claimed to Japanese Patent Application No. 2012-072013 filed on Mar. 27, 2012, the entire contents of which are incorporated herein by reference.

BACKGROUND

1. Technical Field

The present invention generally relates to an injection molding machine.

2. Description of Related Art

An injection molding machine is provided to manufacture a molding product by filling a cavity with a molten resin and solidifying the molten resin. The mold apparatus is formed by a fixed mold and a moving mold. The cavity is formed between the fixed mold and the moving mold at a time of clamping a mold. The molding product molded in the cavity is protruded from the moving mold after opening the mold. An ejector apparatus may be used to protrude the molding product (for example, Patent Document 1). [Patent Document 1] International Publication Pamphlet No. WO2005/068155

SUMMARY

According to an aspect of the present invention, there is provided an injection molding machine including an ejector rod that is used to protrude a molding product from a mold, a driving source that moves the ejector rod in an axial direction of the ejector rod, a controller that controls the driving source, a position detector that detects the position of the ejector rod, and an operations unit that receives an input operation input by a user, wherein the controller sets up a current position of the ejector rod, which is detected by the position detector when the operations unit receives a first button operation operated by the user, to be a waiting position of the ejector rod after protruding the ejector rod or to be a protruding position of the ejector rod.

DETAILED DESCRIPTION

However, in the ejector apparatus described above, a user may erroneously set up the ejector apparatus. In this case, the ejector apparatus may be broken.

Accordingly, embodiments of the present invention may provide a novel and useful injection molding machine. More specifically, the embodiments of the present invention may reduce erroneous setups in the ejector apparatus.

A description is given below, with reference to the FIG. 1 through FIG. 5 of embodiments of the present invention. Where the same reference symbols are attached to the same parts, repeated description of the parts is omitted.

The description herein is given using the a premise that the moving direction of the moving platen in closing the mold is a forward direction and the moving direction of the moving platen in opening the mold is a backward direction.

Figure 1:
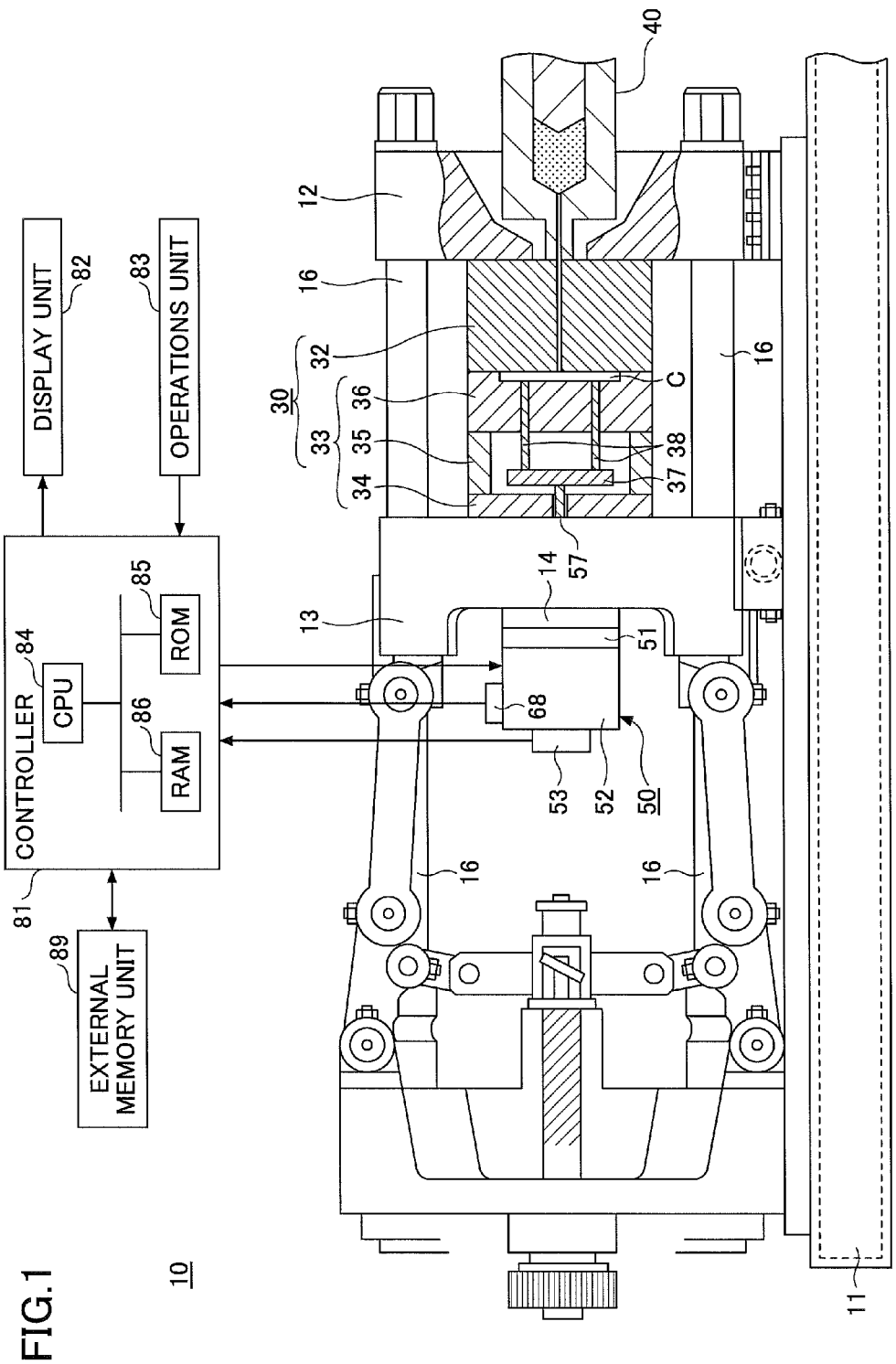
FIG. 1 illustrates the structure of an injection molding machine of an example.
Figure 2:
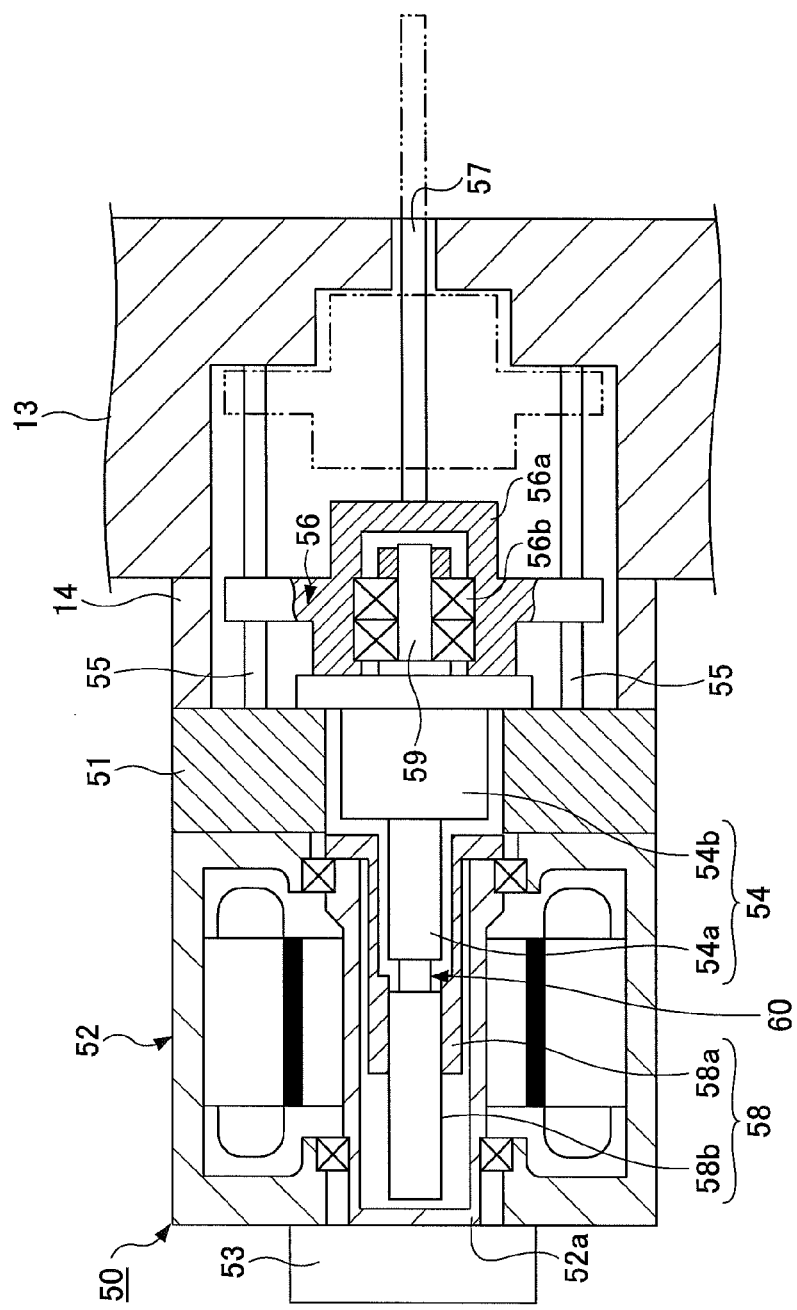
FIG. 2 is an enlarged view of an important portion of FIG. 1.

FIG. 1 illustrates the structure of an injection molding machine of an embodiment. FIG. 1 illustrates a mold clamping state where the mold is clamped. FIG. 2 is an enlarged view of an important portion of FIG. 1. Referring to FIG. 2, a state where an ejector rod is in a standard position is indicated by a solid line. Meanwhile, a state where the ejector rod is in a protruding position is indicated by a two-dot chain line.

The injection molding machine 10 includes a frame 11, a fixed platen 12 fixed to the frame 10, and plural tie bars 16 extending from the fixed platen 12 (for example, four tie bars). The injection molding machine 10 is disposed so as to face the fixed platen 12. The injection molding machine 10 further includes a moving platen 13 disposed so as to slide along the tie bars 16 (right and left directions in FIG. 1). A moving mold 33 is attached to a surface of the moving platen 13 facing the fixed platen 12. A fixed mold 32 is attached to a surface of the fixed platen 12 facing the moving platen 13. A mold apparatus 30 is constituted by the fixed mold 32 and the moving mold 33.

The moving mold 33 includes a mold attaching plate 34, a spacer block 35, and a mold plate 36, which are attached to the moving platen 13. A space is formed so as to be interposed between the mold attaching plate 34 and the mold plate 36 and surrounded by the spacer block 35. The ejector plate 37 is accommodated in the space so that the ejector plate 37 is movable inside the space back and forward. Ejector pins 38 are fixed to the ejector plate 37 so that the ejector pins 38 protrude forward from the ejector plate 37. The ejector pins 38 penetrate the mold plate 36. The leading end surfaces of the ejector pins 38 face the cavity C when the cavity C is filled with the molten resin, as illustrated in FIG. 1.

By moving the movable platen 13 close to or apart from the fixed platen 12, the mold is closed, clamped, or opened. The cavity C is formed between the moving mold 33 and the fixed mold 32 in the mold clamping state. The molten resin injected from an injection device 40 fills the cavity C. The injected resin is solidified to be the molding product. The molding product is protruded from the moving mold 33 by the ejector pin 38 after opening the mold. An ejector apparatus 50 is used to protrude the ejector pin 38.

Referring to FIG. 2, the ejector apparatus 50 includes an ejector attaching plate 51 fixed to the moving platen 13 via a spacer 14. To the ejector attaching plate 51, an ejector motor 52 as a driving source, a ball screw unit 54 for converting a rotary motion of the output shaft 52a of the ejector motor 52 to a rotary and rectilinear motion, and guide shafts 55. The ejector apparatus 50 includes a bearing box 56 movable forward and backward along the guide shafts 55. The bearing box 56 converts a rotary and rectilinear motion generated by the ball screw unit 54 to a rectilinear motion and transmits the generated rotary motion to the ejector rod 57. When the ejector rod 57 moves forward and backward, the ejector plate 37 disposed inside the moving mold 33 causes the ejector pin 38 to move forward and backward.

The ejector motor 52 includes a cylindrical output shaft 52a. A spline unit 58 is provided to transmit rotation of the output shaft 52a to the ball screw unit 54 inside the output shaft 52a. The spline unit 58 includes a cylindrical spline nut 58a and a splice shaft 58b to be engaged with the spline nut 58a to perform the splining function. The spline shaft 58b is rotatable along with the spline nut 58a so as to move along the axial direction of the spline nut 58a. The ball screw unit 54 includes a ball screw shaft 54a integrally formed with the spline shaft 58b and a ball screw nut 54b screwed with the ball screw shaft 54a. The ball screw nut 54b is fixed to the ejector attaching plate 51. A shaft portion 59 is integrally formed with the ball screw shaft 54a on a front end of the ball screw shaft 54a. The shaft portion 59, the ball screw shaft 54a, and the spline shaft 58b form a shaft unit 60.

The guide shafts 55 restrict a rotary motion of the bearing box 56 and permit a rectilinear motion of the bearing box 56. The front ends of the guide shaft 55 are fixed to the moving platen 13.

The bearing box 56 includes a housing 56a which is prevented from rotating by the guide shafts 55 and a bearing 56b which rotatably supports the shaft portion 59 of the shaft unit 60 inside the housing 56a. The back end of the ejector rod 57 is attached to the bearing box 56. The front end of the ejector rod 57 may be connected to the ejector plate 37 disposed inside the moving mold 33.

When the ejector motor 52 is driven in a positive direction, the shaft unit 60 rotates and moves forward. Then, the bearing box 56 moves forward along the guide shafts 55. Along with the movement of the bearing box 56, the ejector rod 57 moves forward, and the ejector plate 37 accommodated in the moving mold 33 moves forward. As a result, the ejector pin 38 forward protrudes from the moving mold 33. Thus, the molding product can be demolded.

When the ejector motor 52 is driven in a negative direction, the shaft unit 59 rotates and moves backward. Then, the bearing box 56 moves backward along the guide shafts 55. Along with this, the ejector rod 57 moves backward. Thus, the ejector plate 37 and the ejector pin 38 returns to the original position.

Within the embodiment, the ejector rod 57 is directly connected to the ejector plate 37. However, the ejector rod 57 may not be directly connected to the ejector plate 37. After the ejector rod 57 moves forward and contacts the ejector plate 37, the ejector rod 57 may further move forward to push the ejector plate 37 to cause the ejector plate 37 to move forward. The ejector plate 37 is biased backward by a force of a spring (not illustrated) so that he ejector plate 37 moves backward when the ejector rod 57 moves backward.

The ejector motor 52 has a position detector 53 for detecting the position of the ejector rod 57. The position detector 53 includes an encoder for detecting the revolving speed of the output shaft 52a of the ejector motor 52. Detection signals are supplied to a controller 81 (see FIG. 1).

The position detector 53 includes an absolute encoder for detecting the absolute value of the rotation angle 53 of the output shaft 52a. In activating power of the injection molding machine 10, positional calibration of the ejector rod 57 is unnecessary.

An electric current is supplied to the ejector motor 52 so that the revolving speed of the ejector motor 52 becomes a setup value. Thus, the rotating torque corresponding to the supplied current is generated. The pressure corresponding to the rotating torque effects on the ejector rod 57.

A pressure detector 68 for detecting pressure effecting on the ejector rod 57 (the rotating torque of the ejector motor 52) is connected to the ejector motor 52. The pressure detector 68 is comprised of a current sensor for detecting a supply current to, for example, the ejector motor 52. A detection signal detected by the current sensor is supplied to the controller 81.

Referring to FIG. 1, the injection molding machine 10 includes a controller 81 including a microcomputer or the like, a display unit 82 including a liquid crystal panel or the like, and an operations unit 83 comprised of a keyboard, a mouse, or the like. The display unit 82 and the operations unit 83 may be comprised of an integrated touch panel. The operations unit 83 is comprised of a transparent position detecting unit provided on the display unit 82. By detecting a touched position touched by a user, an input operation by the user can be received. Further, the operations unit 83 may be comprised of an operations panel including a numeric keypad, cursor keys, execution keys or the like instead of a keyboard or a mouse. The operations unit 83 may be comprised of the position detecting unit of the position detecting unit and the operations panel, it is possible to receive the inputs from any one or both of the position detecting unit of the position detecting unit and the operations panel.

The controller 81 includes a CPU 84, a ROM 85 storing a control program or the like, a RAM 86 which stores results of operations so as to be read and written, an input interface, an output interface, a timer, a counter or the like. The controller 81 can realize various functions by causing a program stored in a recording medium such as a ROM 85 or an external memory unit (e.g., a harddisk) to be run in the CPU 84.

The controller 81 has a function of displaying various setup screens of the injection molding machine 10 on the display unit 82. The user operates the operations unit 83 while watching the display unit 82 to perform various setups of the injection molding machine 10. The items set up by the user can be, for example, an operation mode of the injection molding machine 10, an operation of drive units of the injection molding machine 10, or the like.

The controller 81 has a function of sending an operation command corresponding to the various processes to various drive units based on the various setup values set up by the user. Further, the controller 81 has a function of performing a feedback control of various drive units (e.g., the ejector motor 52) based on detection results of the various sensors (e.g., the position detector 53 or the pressure detector 68).

Figure 3:
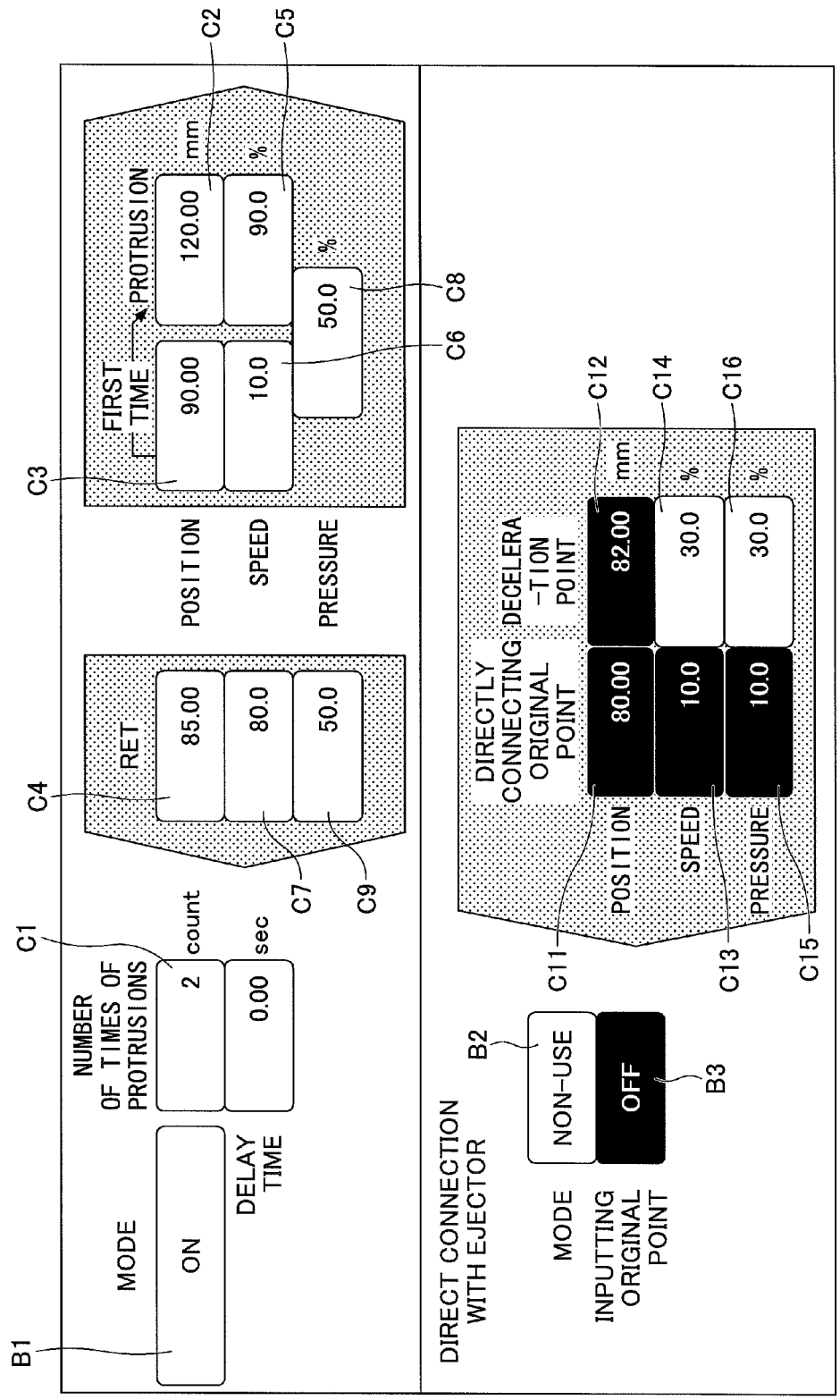
FIG. 3 illustrates a setup screen for an ejector apparatus of the embodiment.

FIG. 3 illustrates a setup screen for an ejector apparatus of the embodiment. The setup screen is displayed on the display unit 82 in response to a user operation in the operations unit 83.

For example, referring to FIG. 3, the upper stage of the setup screen includes an ejector mode button B1 for enabling a user to select use or non-use of the ejector apparatus 50 and columns C1 to C9 related to setups of the ejector rod 57. The column C1 designates the number n of times of protrusions for each molding product (n is a natural number of 1 or more). The column C2 designates a protruding position. The column C3 designates an acceleration position where a setup speed is accelerated during a first protrusion. The column C4 designates a return position after protrusions of k-th ($k=n-1 \geq 1$) times. The column C5 designates a forward speed from the acceleration position or the return position to the protruding position. The column C6 designates a forward speed from the acceleration position or the return position to the protruding position. The column C7 designates a backward speed. The column C8 designates the pressure during a forward movement. The column C9 designates the pressure during a backward movement. The position of the ejector rod 57 is displayed by the distance (mm) from the standard position. The standard position is the maximum backward position of the ejector rod 57 when the moving mold 33 is not attached to the moving platen. Referring to FIG. 2, the standard position is a mechanical end position where the bearing box 56 contacts the ball screw nut 54b as illustrated by the solid line. The forward and backward speeds of the ejector rod 57 (the revolving speed of the ejector motor 52) and the pressure effecting on the ejector rod 57 (the rotating torque of the ejector motor) is displayed by a ratio (%) relative to the standard values.

If the user wishes to switch over use or non-use of the ejector apparatus 50, a cursor of a mouse is positioned on the ejector mode button B1 and a button of the mouse is clicked. The display of the ejector mode button B1 is changed between "ON" and "OFF" upon the click. In a case where the display of the ejector mode button B1 is "ON", the ejector apparatus 50 is used for the protrusion of the molding product. Meanwhile, in a case where the display of the ejector mode button B1 is "OFF", the ejector apparatus 50 is not used for the protrusion of the molding product. Then, the operation of the ejector apparatus 50 is prohibited. In a case where the display of the ejector mode button B1 is "OFF", the ejector apparatus 50 is stopped at the standard position. Then, the leading end portion of the ejector rod 57 is retracted from a mold attaching surface of the moving platen 13 as illustrated by the solid line in FIG. 2. Depending on the structure of the mold apparatus 30, the ejector apparatus 50 may not be used and the molding product is taken out by a molding product drawing machine located outside the injection molding machine 10.

If the user wishes to change the setup values indicated in the columns C1 to C9, the cursor of the mouse is positioned at the columns, the button of the mouse is clicked, and a number is input by a keyboard. The result of the input is reflected on the displays of the columns C1 to C9 and stored in a recording medium such as the RAM 86, the external memory unit 89, or the like.

Instead of positioning the cursor of the mouse, touching a touch panel or an operation of a cursor key on an operations panel may be performed. Instead of clicking the button of the mouse, an execution key may be operated. Instead of the input operation of the keyboard, numeric keys on the operations panel may be operated. Input operations of the numeric keys may be confirmed by operations of the execution key.

Referring to FIG. 3, the ejector apparatus 50 performs the following operations under a control by the controller 81. (1) The ejector rod 57 starts to move forward at a predetermined timing. The ejector rod 57 moves forward from the standard position to the acceleration position (the distance from the standard position is 90 mm) at a setup speed of 10% (The upper limit value of the pressure during the forward movement is 50%). (2) The ejector rod 57 moves forward from the acceleration position to the protruding position (the distance from the standard position is 120 mm) at a setup speed of 90% (The upper limit value of the pressure during the forward movement is 50%). Thus, the first protrusion is completed. In the course of the first protrusion, the molding product is adhered to the mold apparatus 30. Therefore, a force is required to demold the molding product. Therefore, the setup speed from the standard position to the acceleration position is slow so that the pressure effecting on the ejector rod 57 does not exceed the upper limit value. In the course of the first protrusion, the molding product is peeled off the molded apparatus 30. Thus, a force for demolding the molding product is unnecessary. The setup speed from the acceleration position to the protruding position is made faster to reduce the molding cycle. (3) The ejector rod 57 moves backward at a setup speed of 80% from the protruding position to the return position (the distance from the standard position is 85 mm) with the upper limit value of the pressure is 50%. (4) The ejector rod 57 moves forward from the return position to the protruding position at a setup speed of 90% (the upper limit value of the pressure during the forward movement is 50%). Thus, a second protrusion is completed. (5) The ejector rod 57 moves backward from the protruding position to the standard position at the setup speed of 80% (the upper limit value of the pressure during the backward movement is 50%). Thus, an ejection process is completed.

In a case where the number of times of protrusions n=1, after the first protrusion is completed, the ejector rod 57 moves backward from the protruding position to the standard position. Then, the ejector rod 57 does not temporarily stop at the return position.

Referring to FIG. 3, the ejector rod 57 waits at the standard position during mold closing, mold clamping, filling the inside of the mold apparatus 30 with the molten resin, or the like. After the mold opening, the ejector rod 57 moves forward from the standard position to the protruding position.

Figure 4:
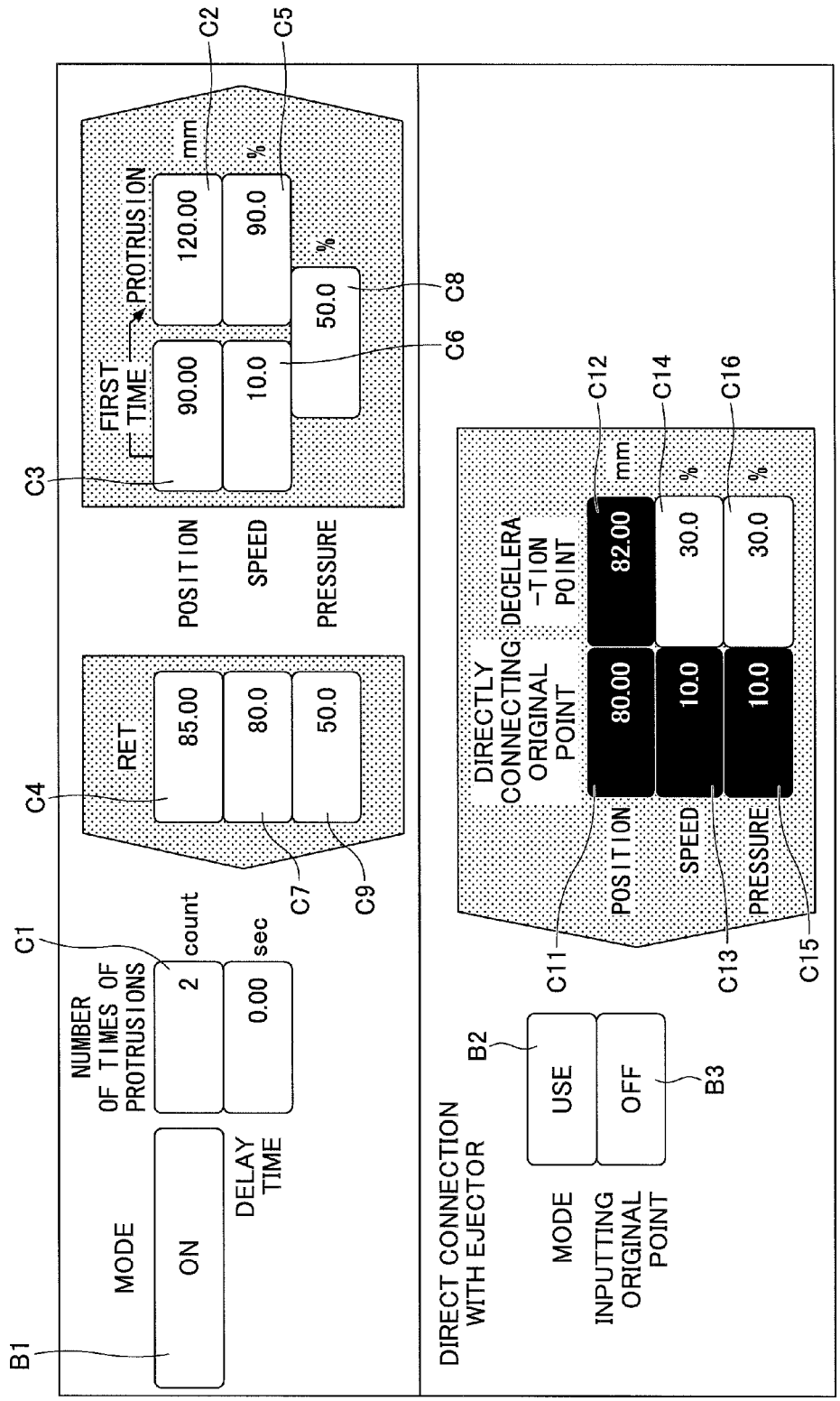
FIG. 4 illustrates a state of the setup screen where a direct connection mode button B2 is selected by a user.

FIG. 4 illustrates a state of the setup screen where a direct connection mode button B2 is selected by the user.

Referring to FIG. 4, the lower stage of the setup screen includes a direct connection mode button B2, an original point inputting button B3, and columns C11 to C16 related to the setup of the ejector rod 57. The direct connection mode button B2 is provided for enabling a user to select use or non-use of the setup by the operation of the original point inputting button B3. The original point inputting button B3 is provide to set the current position of the ejector rod 57 detected by the position detector 53 as the waiting position after protruding the ejector rod 57 when the original point inputting button B3 is operated. The column C11 designates the waiting position. The column C12 designates a deceleration position where the setup speed is decelerated in course of the backward movement from the protruding position to the waiting position. The column C13 designates the backward speed in a low speed section from the deceleration position to the waiting position. The column C14 designates the backward speed in a high speed section from the protruding position to the deceleration position. The column C16 designates the pressure in the high speed section. The position of the ejector rod 57 is displayed by the distance (mm) from the standard position. The speed of the ejector rod and the pressure effecting on the ejector rod 57 is displayed by a ratio (%) relative to a standard value.

When the user intends to set the current position of the ejector rod 57 as the waiting position, the cursor of the mouse is positioned at the original point inputting button B3 and the mouse is clicked. Hereinafter, the clicking of the mouse while the cursor of the mouse is positioned at the original point inputting button B3 is referred to as an original point inputting button operation (a first button operation). When the original point inputting button is operated the display of the original point inputting button B3 is switched from "OFF" to "ON". Further, the current position of the ejector rod 57 detected by the position detector 53 at the time of operating the original point inputting button is recorded as the waiting position in the recording medium such as a RAM 86, an external memory unit 89, or the like, and displayed in the column C11. Thereafter, the display of the original point inputting button B3 is changed from "ON" to "OFF".

As described, the current position of the ejector rod 57 detected by the position detector 53 at the time of operating the original point inputting button is automatically set as the waiting position. Therefore, an erroneous setup caused by an erroneous number input on the keyboard can be prevented. Further, the state of the ejector apparatus 50 when the ejector rod 57 is in the waiting position can be confirmed by the user before molding.

The original point inputting button can be operated after exchanging the mold apparatus and before starting molding. By exchanging the mold apparatus 30, the structure of the mold apparatus 30 and the structure of the protruding member for the molding product (the ejector plate 37 and the ejector pin 38) changes. For example, a plate-like stripper plate may be used instead of the rod-like ejector pin 38. When the protruding member for the molding product is directly connected to the ejector rod 57, the waiting position of the ejector rod 57 is set in conformity with the structure of the mold apparatus 30 or the like. When the ejector rod 57 is positioned at the waiting position, the waiting position is set so that a gap is formed between the protruding member for the molding product (for example, the ejector plate 37) and the mold attaching plate 34. After the gap disappears and the ejector rod 57 further moves backward, an excessive load is applied to the ejector rod 57 to break the ejector rod 57. Meanwhile, the when the protruding member for the molding product is not directly connected to the ejector rod, after the gap disappears and the ejector rod further moves backward, an excessive load is not applied to the ejector rod 57. Therefore, in a case where the protruding member for the molding product is not directly connected to the ejector rod 57, the ejector rod 57 may move backward irrespective of the structure of the mold apparatus 30.

The controller 81 may calculate the deceleration position based on the current position of the ejector rod 57, which is detected by the position detector 53 at the time of operating the original point inputting button. The controller 81 may display the calculated deceleration position in the column C12. The deceleration position is set to be forward by a predetermined distance (2.0 mm in FIG. 4) form the current position of the ejector rod 57. Since the deceleration position is automatically set, the time and effort for the user can be omitted. Further, the erroneous setup by the user can be restricted.

Further, the controller 81 sets the backward speed in the low speed section (the column C13), the backward speed in the high speed section (the column C14), the pressure in the low speed section (the column C15), and the pressure in the high speed section (the column C16) to be a value previously recorded in the ROM 85, the external memory unit 89, or the like at the time of operating the original point inputting button. Since the setup value is automatically set, the time and effort for the user can be omitted. Further, the erroneous setup by the user can be restricted.

The setups of the backward speed in the high speed section (the column C14) and of the pressure (the column C16) in the high speed section are permitted to be changed by the user. If the user wishes to change the setups, the cursor of the mouse is positioned at the column C14 or C16. The mouse is clicked and the number is input by the keyboard. The result of the input is reflected on the displays of the columns C14 and C16 and recorded in the recording medium such as the RAM 86, the external memory unit 89, or the like.

Meanwhile, the user may prohibit a setup change for the waiting position (the column C11), the deceleration position (the column C12), the backward speed in the low speed section (the column C13), and the pressure in the low speed section (the column C15). When the user erroneously sets up, there is a high probability of damage of the ejector apparatus 50.

When the user switches over use or non-use of the setup by operating the original point inputting button, the cursor of the mouse is positioned at the direct connection mode button B2 and the mouse is clicked. Hereinafter, the clicking of the mouse while the cursor of the mouse is positioned at the direct connection mode button B2 is referred to as a "direct connection mode button operation" (a second button operation). Every time the direct connection mode button is operated, the display of the direct connection mode button is switched over between "use" or "non-use". When the display of the direct connection mode button B2 is "use" as illustrated in FIG. 4, the setup by operating the original point inputting button can be used to control the ejector apparatus 50. When the display of the direct connection mode button B2 is "non-use" as illustrated in FIG. 3, the setup by operating the original point inputting button is not used to control the ejector apparatus 50.

For example, the operation of the direct connection mode button so as not to use the setup by operating the original point inputting button is performed at a time of replacing the mold apparatus 30, specifically at a time of releasing a direct connection between the ejector rod 57 and the ejector plate 37. Thereafter, the ejector apparatus 50 is in the state of non-use as the result of the operation of the ejector mode button B1. Then, the ejector rod 57 is moved backward to the standard position. Then, the leading end portion of the ejector rod 57 retracts from the mold attaching surface of the moving platen 13. Under this state, a new moving mold 33 is attached to the moving platen 13. Thus, the moving mold 33 is prevented from colliding with the ejector rod 57.

Referring to FIGS. 3 and 4, the setup screen simultaneously displays the status of the operation of the original point inputting button (for example, whether the operation is done), and the status of the direct connection mode button (for example, whether the operation is done). The user can accurately recognize the current setup.

The controller 81 can prevent another setup by operating the original point inputting button until the operation unit 83 receives a predetermined input operation by the user. Thus, it is possible to prevent the erroneous setup by operating the original point inputting button, which is not intended. In a case where the other setup by the original point inputting button operation is prohibited, the previous setup by operating the original point inputting button is used to control the ejector apparatus 50.

For example, the controller 81 displays by popping a release button for releasing the above restrictions and a confirmation message on the setup screen up. When the cursor of the mouse is positioned at the release button and the mouse is clicked, the other setup is performed by operating the original point inputting button to thereby update the data of the waiting position of the recording medium. Hereinafter, the clicking of the mouse while the cursor of the mouse is positioned at the release button is referred to as a "release button operation" (a second button operation. A non-release button preventing the restrictions from being released is displayed by popping up at the time of displaying the release button. When the user operates the non-release button instead of the release button or an input operation is not performed for a predetermined period of time, the other setup by the original point inputting button is not performed. Therefore, the data of the waiting position of the recording medium are not renewed.

Further, the controller 81 may display the release button for releasing the above restrictions on the setup screen at the time of displaying the original point inputting button B3. In a case where the original point inputting button is operated in a predetermined period of time after the release button is operated, the other setup is performed by operating the original point inputting button to renew the waiting position of the recording medium. Thereafter, the controller 81 prohibits the other setup by operating the original point inputting button until a new operation of releasing the button is received by the operations unit 83.

Referring to FIG. 4, the ejector apparatus 50 performs the following operations under a control by the controller 81. (1) The ejector rod 57 starts to move forward at a predetermined timing. The ejector rod 57 moves forward from the waiting position (the distance from the standard position is 80 mm) to the acceleration position (the distance from the standard position is 90 mm) at a setup speed of 10% (the upper limit value of the pressure during the forward movement is 50%). (2) The ejector rod 57 moves forward from the acceleration position to the protruding position (the distance from the standard position is 120 mm) at a setup speed of 90% (the upper limit value of the pressure during the forward movement is 50%). Thus, the first protrusion is completed. (3) The ejector rod 57 moves backward at a setup speed of 80% from the protruding position to the return position (the distance from the standard position is 85 mm) with the upper limit value of the pressure in the backward movement is 50%. (4) The ejector rod 57 moves forward from the return position to the protruding position at a setup speed of 90% (the upper limit value of the pressure during the forward movement is 50%). Thus, a second protrusion is completed. (5) The ejector rod 57 moves backward at a setup speed of 30% from the protruding position to the deceleration position (the distance from the standard position is 82 mm) with the upper limit value of the pressure in the backward movement is 30%. (6) The ejector rod 57 moves backward from the deceleration position to the waiting position at the setup speed of 10% (the upper limit value of the pressure during the backward movement is 10%). Thus, an ejection process is completed.

Referring to FIG. 4, the ejector rod 57 waits at the waiting position during mold closing, mold clamping, filling the inside of the mold apparatus 30 with the molten resin, or the like. After the mold opening, the ejector rod 57 moves forward from the waiting position to the protruding position.

Figure 5:
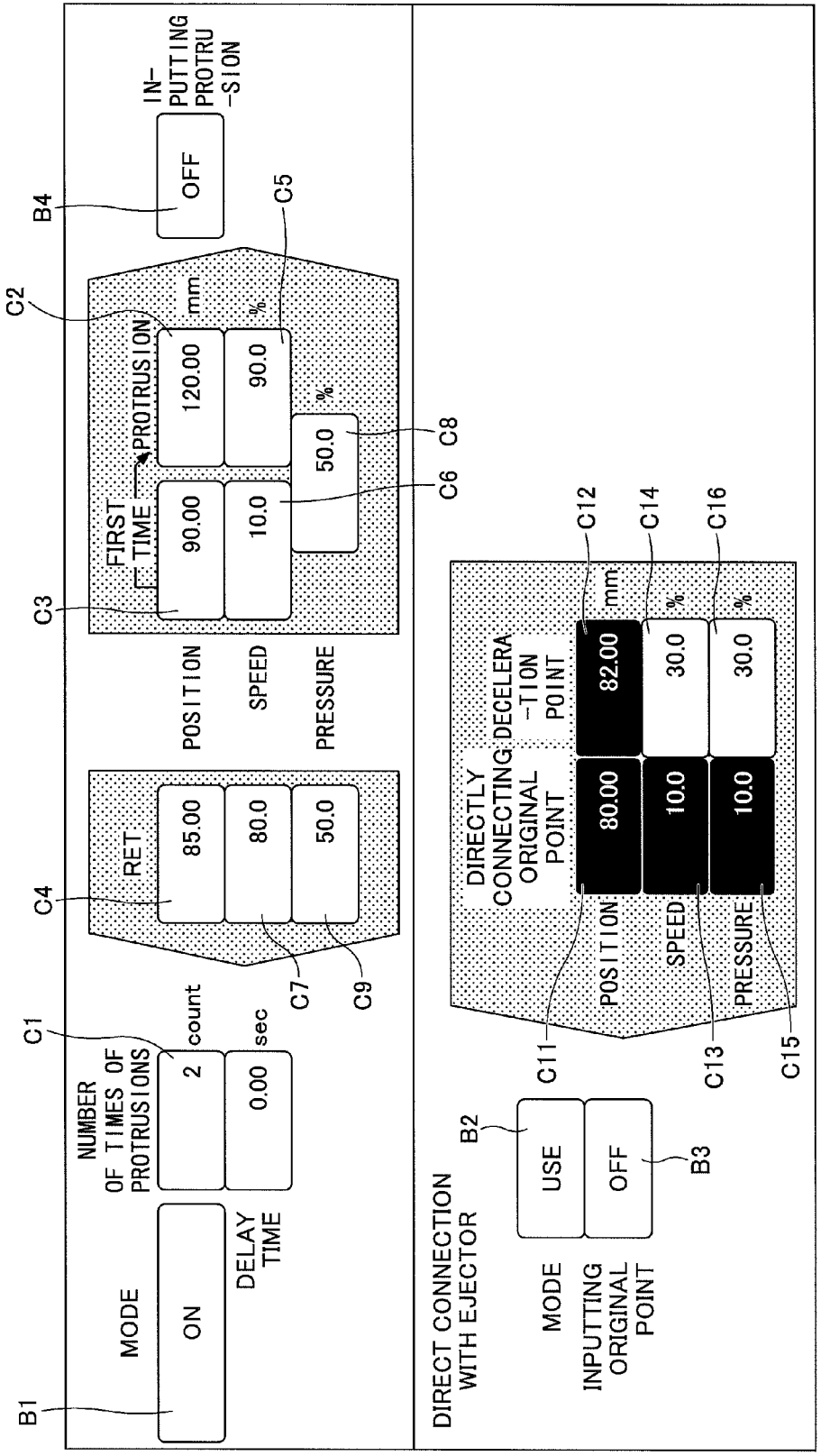
FIG. 5 illustrates a modified example of FIG. 4.

FIG. 5 illustrates a modified example of FIG. 4. This modified example differs from the example illustrated in FIG. 4 at a point that a protrusion input button B4 is added to the setup screen. The description is given below of the point of difference.

When the user intends to set the current position of the ejector rod 57 as the protruding position, the cursor of the mouse is positioned at the protrusion input button B4 and the mouse is clicked. Hereinafter, the clicking of the mouse while the cursor of the mouse is positioned at the protrusion input button B4 is referred to as a "protrusion input button operation" (a third button operation). When the protrusion input button is operated, the display of the protrusion input button B4 is switched from "OFF" to "ON". Further, the current position of the ejector rod 57 detected by the position detector 53 at the time of operating the original point inputting button is recorded as the protruding position in a RAM 86, an external memory unit 89, or the like. Simultaneously, the display of the column C2 is renewed. Thereafter, the display of the protrusion input button B4 is changed from "ON" to "OFF".

Within the modified example, the current position of the ejector rod 57 to be detected by the position detector 53 is automatically set up by operating the protrusion input button. Therefore, an erroneous setup caused by an erroneous number input on the keyboard can be prevented. Further, the state of the ejector apparatus 50 when the ejector rod 57 is in the waiting position can be confirmed by the user before molding.

The controller 81 may calculate the acceleration position based on the current position of the ejector rod 57, which is detected by the position detector 53 at the time of operating the protrusion input button. The controller 81 may display the calculated acceleration position in the column C3. The acceleration position is set to be backward by a predetermined distance (30.00 mm in FIG. 5) from the current position of the ejector rod 57. The time and effort for the user can be omitted. Further, the erroneous setup by the user can be restricted.

The controller 81 may calculate the return position based on the current position of the ejector rod 57, which is detected by the position detector 53 at the time of operating the protrusion input button. The controller 81 may display the calculated return position in the column C4. The return position is set to be backward by a predetermined distance (35.00 mm in FIG. 5) from the current position of the ejector rod 57. The time and effort for the user can be omitted by the encoder. Further, the erroneous setup by the user can be restricted.

When the protrusion input button is operated, the controller 81 may set up the forward speed from the acceleration position or the return position to the protruding position (the column C5), the forward speed to the acceleration position during the first protrusion (the column C6), the backward speed (the column C7), the pressure during the forward movement (the column C8), and the pressure during the backward movement (the column C9) to be the values recorded by a recording medium such as the ROM 85, the external memory unit 89, or the like. Then, the time and effort for the user can be omitted. Further, the erroneous setup by the user can be restricted.

The setup values of the columns C1 to C9 are permitted by the user to change as described with reference to FIG. 3.

Meanwhile, the setup screen may include a selection button (not illustrated) for causing the user to select the validity or the invalidity of the setup by operating the protrusion input button. In a case where the setup by operating the protrusion input button is invalid, the protruding position may be prevented from being renewed by operating the protrusion input button in order to avoid the erroneous operations.

With the above embodiment, the driving source of the ejector apparatus 50 is the ejector motor. The rotary motion of the ejector motor 52 is converted to the rectilinear motion by the ball screw unit 54. Instead of the ejector motor 52, a fluid pressure cylinder such as a hydraulic cylinder or a pneumatic cylinder may be used. The types of the driving source is not specifically limited.

Further, within the ball screw unit 54 of the embodiment, the ball screw nut 54b is fixed. Therefore, the ball screw shaft 54a rotates and moves in the axial directions when the output shaft 52a rotates. However, the method is not specifically limited. For example, the ball screw shaft may rotate when the output shaft 52a rotates to move the ball screw nut in the axial direction. For example, the ball screw nut may rotate when the output shaft 52a rotates to move the ball screw shaft in the axial direction.

Within the above embodiment, the encoder for detecting the revolving speed of the output shaft 52a of the ejector motor 52 is used as the position detector 53 for detecting the position of the ejector rod 57. However, various types and various modes of the position detector can be used. For example, as the position detector may be a displacement sensor for detecting the position of the ejector rod 57, a gap sensor for detecting the gap between the ejector plate 37 and the mold attaching plate 34, or the like.

Further, within the embodiment, the original point inputting button B3 and the direct connection mode button B2 are displayed as images on the setup screen. However, the original point inputting button B3 and the direct connection mode button B2 may be formed by a mechanical push button or the like.

Further, within the embodiment, the original point inputting button B3 is operated when the ejector rod 57 is directly connected to the ejector plate 37. However, the original point inputting button B3 may be operated when the ejector rod 57 is not directly connected to the ejector plate 37. Thus, the waiting position of the ejector rod 57 can be set forward relative to the standard position to thereby shorten the molding cycle.

According to the embodiment of the present invention, the injection molding machine with which the erroneous setup of the ejector apparatus can be prevented is provided.

It should be understood that the invention is not limited to the above-described embodiment, but may be modified into various forms on the basis of the spirit of the invention. Additionally, the modifications are included in the scope of the invention.

What is claimed is:

1. An injection molding machine comprising:
   an ejector rod that is used to protrude a molding product from a mold;
   a driving source that moves the ejector rod in an axial direction of the ejector rod;
   a controller that controls the driving source;
   a position detector that detects the position of the ejector rod; and
   an operations unit that receives an input operation input by a user,
   wherein, the controller sets up a current position of the ejector rod, which is detected by the position detector when the operations unit receives a first button operation operated by the user, to be a waiting position of the ejector rod after protruding the ejector rod or to be a protruding position of the ejector rod,
   the controller sets up a value of the current position of the ejector rod to be a value of the waiting position, and
   the controller calculates a deceleration position from which a setup speed of the ejector rod is decelerated while the ejector rod moves from the protruding position to the waiting position based on the current position of the ejector rod, the current position being detected by the position detector when the operations unit receives the first button operation by the user.

2. The injection molding machine according to claim 1, wherein the operations unit receives a second button operation, by which use or non-use of a setup set up by the first button operation is selected by the user.

3. The injection molding machine according to claim 2, further comprising:
   a display unit that displays a setup screen for an ejector apparatus including the ejector rod and the driving source,
   wherein the setup screen simultaneously displays a status of the first button operation and a status of the second button operation.

4. The injection molding machine according to claim 1, wherein the controller prohibits another setup by the first button operation until the operations unit receives a predetermined input operation by the user.

5. The injection molding machine according to claim 1, wherein the controller sets up a setup speed of the ejector rod while the ejector rod moves from the deceleration position to the waiting position and a setup pressure effecting on the ejector rod while the ejector rod moves from the deceleration position to the waiting position to be values previously recorded in a recording medium, when the operations unit receives the first button operation by the user.

6. The injection molding machine according to claim 1, wherein the controller sets up the value of the current position of the ejector rod detected by the position detector when the operations unit receives a third button operation by the user to be one of the value of the waiting position and a value of the protruding position, which one is not setup by the first button operation.

* * * * *